(12) United States Patent
Kim et al.

(10) Patent No.: US 12,506,182 B2
(45) Date of Patent: Dec. 23, 2025

(54) BATTERY PACK, BATTERY MANAGEMENT APPARATUS AND VEHICLE HAVING THE SAME (71) Applicants: Hyundai Motor Company, Seoul (KR); Kia Motors Corporation, Seoul (KR)

(72) Inventors: Jinwon Kim, Gyeonggi-do (KR); Jun Seok Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1286 days.

(21) Appl. No.: 17/130,458

(22) Filed: Dec. 22, 2020

(65) Prior Publication Data
US 2021/0408612 A1 Dec. 30, 2021

(30) Foreign Application Priority Data
Jun. 24, 2020 (KR) .................. 10-2020-0077387

(51) Int. Cl.
*H01M 50/249* (2021.01)
*H01M 10/42* (2006.01)
(Continued)

(52) U.S. Cl.
CPC ....... *H01M 10/425* (2013.01); *H01M 10/486* (2013.01); *H01M 10/625* (2015.04);
(Continued)

(58) Field of Classification Search
CPC .................................................. H01M 10/425
See application file for complete search history.

(56) References Cited

U.S. PATENT DOCUMENTS

2008/0280192 A1 11/2008 Drozdz et al.
2010/0136391 A1* 6/2010 Prilutsky ........... H01M 10/6566
429/62
(Continued)

FOREIGN PATENT DOCUMENTS

CN 104201425 A 12/2014
CN 104716399 A 6/2015
(Continued)

OTHER PUBLICATIONS

CN106099251transaltion (Year: 2016).*
(Continued)

*Primary Examiner* — Brian R Ohara
(74) *Attorney, Agent, or Firm* — Fox Rothschild LLP (57) ABSTRACT A battery pack for a vehicle includes: a case having an air outlet and an air inlet; a battery having a plurality of battery cells and disposed in the case; a first temperature detector for detecting a temperature of the at least one battery cell; a second temperature detector for detecting a temperature of air to be discharged through the air outlet; and a fan inducing a flow of air suctioned through the air inlet to be discharged to the air outlet, and to rotate based on at least one of cell temperature information about the temperature of the at least one battery cell detected by the first temperature detector or discharge temperature information about a discharge air temperature detected by the second temperature detector.

13 Claims, 5 Drawing Sheets

(51) Int. Cl.
  *H01M 10/48* (2006.01)
  *H01M 10/625* (2014.01)
  *H01M 10/6563* (2014.01)
  *H01M 50/209* (2021.01)
(52) U.S. Cl.
  CPC ..... *H01M 10/6563* (2015.04); *H01M 50/209* (2021.01); *H01M 50/249* (2021.01); *H01M 2010/4271* (2013.01)

(56) References Cited

U.S. PATENT DOCUMENTS

| | | | | |
|---|---|---|---|---|
| 2015/0147610 | A1* | 5/2015 | Conrardy | H01M 50/262 429/65 |
| 2015/0270587 | A1* | 9/2015 | Cho | H01M 10/482 429/62 |

FOREIGN PATENT DOCUMENTS

| | | |
|---|---|---|
| CN | 106066457 A | 11/2016 |
| CN | 106099251 A | 11/2016 |
| CN | 108075086 A | 5/2018 |
| CN | 109383325 A | 2/2019 |
| CN | 109599638 A | 4/2019 |
| JP | 2008041376 A | 2/2008 |
| JP | 2016-018637 A | 2/2016 |
| JP | 2017091846 A | 5/2017 |
| JP | 2018-063765 A | 4/2018 |
| JP | 6331017 B2 | 5/2018 |
| JP | 6341371 B2 | 6/2018 |
| JP | 6350812 B2 | 7/2018 |
| JP | 2019135696 A | 8/2019 |
| KR | 2012-0037662 A | 4/2012 |
| KR | 10-2016-0134601 A | 11/2016 |
| KR | 10-2020-0060753 A | 6/2020 |

OTHER PUBLICATIONS

CN108075086 (Year: 2018).*
Office Action for Chinese Patent Application No. 2020115348520 from China National Intellectual Property Administration, issued Feb. 13, 2025, 24 pages, with English translation.
Notice of Allowance from China National Intellectual Property Administration for Chinese Patent Application No. 202011534852.0, mailed Oct. 31, 2025, with English translation, 7 pages.
Yanhui, S. et al., "Optimal Analysis on Ventilation Structure of Ni-MH Battery Pack for HEV", Automotive Engineering, 2010 (vol. 32) No. 3, English Abstract, 6 pages.

* cited by examiner

BATTERY PACK, BATTERY MANAGEMENT APPARATUS AND VEHICLE HAVING THE SAME

CROSS-REFERENCE TO RELATED APPLICATION(S)

This application claims under 35 U.S.C. § 119 the benefit of Korean Patent Application No. 10-2020-0077387, filed on Jun. 24, 2020, the entire contents of which are incorporated by reference herein.

BACKGROUND

(a) Technical Field

The disclosure relates to a battery pack for diagnosing overheating of a battery, a battery management apparatus, and a vehicle having the same.

(b) Description of the Related Art

Vehicles typically control a start by using a battery, and when the start is complete, the vehicles may be driven by an engine and/or motor. The vehicles include motor vehicles (internal combustion engine-driven vehicles) driven with mechanical power produced by burning fuel oil, such as gasoline and diesel, and eco-friendly vehicles driven by electrical power so as to reduce an amount of harmful fuel emissions and increase fuel efficiency.

The eco-friendly vehicles include electric vehicles having a rechargeable power supply comprised of a battery and a motor, and the electric vehicles drive wheels by rotating the motor with electricity charged in the battery. The eco-friendly vehicles also include hybrid vehicles having an engine, a battery, and a motor, and the hybrid vehicles control mechanical power of the engine and electrical power of the motor. The eco-friendly vehicles further include hydrogen fuel cell vehicles.

The battery is a rechargeable and dischargeable secondary battery, mounted in an eco-friendly vehicle in a form of a battery pack, and a battery module composed of a plurality of cells may be connected in series to obtain necessary power.

When charging or discharging the battery cells, a relatively high current is input or output. As a result, there is a problem that a large amount of heat is generated in each of the battery cells.

In the case of a lithium ion battery, gas is generated when the battery is overheated, which can result in a fire.

SUMMARY

An aspect of the disclosure is to provide a battery pack for detecting a cell temperature of a battery, a suction temperature of air suctioned into a case, and a discharge temperature of air discharged from the case.

Another aspect of the disclosure is to provide a battery management apparatus and a vehicle for diagnosing a thermal runaway of the battery based on the discharge temperature of air discharged from the case and controlling an output of notification information based on whether or not the thermal runaway occurs.

Another aspect of the disclosure is to provide a battery management apparatus and a vehicle for diagnosing thermal runaway of the battery based on the discharge temperature and any one of the cell temperature of the battery or the suction temperature of the suctioned air and controlling the output of the notification information based on whether or not the thermal runaway occurs.

Another aspect of the disclosure is to provide a battery management apparatus and a vehicle for discharging venting gas generated from a battery cell to the outside by rotating a fan at a predetermined RPM when thermal runaway occurs.

Additional aspects of the disclosure will be set forth in part in the description which follows and, in part, will be obvious from the description, or may be learned by practice of the disclosure.

In accordance with an aspect of the disclosure, a battery pack may include a case having an air outlet and an air inlet; a battery composed of a plurality of battery cells, the battery configured to be accommodated in the case; a first temperature detector provided in at least one battery cell of the plurality of battery cells, the first temperature detector configured to detect a temperature of the at least one battery cell; a second temperature detector provided on the air outlet side of the case, the second temperature detector configured to detect a temperature of air to be discharged through the air outlet; and a fan provided around at least one of the air outlet or the air inlet of the case, configured to induce a flow of air suctioned through the air inlet to be discharged to the air outlet, and to rotate based on at least one of cell temperature information about the temperature of the at least one battery cell detected by the first temperature detector or discharge temperature information about a discharge air temperature detected by the second temperature detector.

The battery pack may further include a battery management apparatus configured to determine whether the at least one battery cell is in a thermal runaway state based on the cell temperature information, and to control the fan so that the fan rotates at predetermined revolutions per minute (RPM) in response to the at least one battery cell being in the thermal runaway state.

The battery pack may further include a third temperature detector configured to detect a temperature of air suctioned through the air inlet; and a battery management apparatus configured to determine whether the battery is in thermal runaway based on suction temperature information about a suction air temperature detected by the third temperature detector, the cell temperature information, and the discharge temperature information.

In response to determining that the discharge air temperature is greater than or equal to the temperature of the at least one battery cell based on the cell temperature information and the discharge temperature information, the battery management apparatus may be configured to control the fan so that the fan rotates at predetermined revolutions per minute (RPM).

The battery pack may further include a switching element configured to supply power to the battery, or to cut off the supply of power to the battery. In response to determining that the discharge air temperature is greater than or equal to the temperature of the at least one battery cell based on the cell temperature information and the discharge temperature information, the battery management apparatus may be configured to control an off operation of the switching element.

In response to determining that the discharge air temperature is greater than or equal to the suction air temperature based on the suction temperature information and the discharge temperature information, the battery management apparatus may be configured to control the fan so that the fan rotates at predetermined revolutions per minute (RPM).

The battery pack may further include a switching element configured to supply power to the battery, or to cut off the supply of power to the battery. In response to determining that the discharge air temperature is greater than or equal to the suction air temperature based on the suction temperature information and the discharge temperature information, the battery management apparatus may be configured to control an off operation of the switching element.

In accordance with another aspect of the disclosure, a battery management apparatus may include a first temperature detector configured to detect a temperature of at least one battery cell of a plurality of battery cells; a second temperature detector configured to detect a temperature of air to be discharged through an air outlet of a case of a battery pack; a third temperature detector configured to detect a temperature of air suctioned through an air inlet of the case of the battery pack; a fan configured to induce a flow of air suctioned through the air inlet to be discharged to the air outlet; and a controller configured to determine whether a battery is in a thermal runaway state based on at least one of cell temperature information about the temperature of the at least one battery cell detected by the first temperature detector, discharge temperature information about a discharge air temperature detected by the second temperature detector, or suction temperature information about a suction air temperature detected by the third temperature detector, and to control the fan so that the fan rotates at predetermined revolutions per minute (RPM) in response to determining that the battery is in the thermal runaway state.

The battery management apparatus may further include a switching element configured to supply power to the battery, or to cut off the supply of power to the battery. The controller may be configured to control an off operation of the switching element in response to determining that the battery is in the thermal runaway state.

The controller may be configured to control the RPM of the fan based on the cell temperature information in response to determining that the battery is in a normal state.

The plurality of battery cells may include at least one first battery cell provided with the first temperature detector, and a second battery cell excluding the first battery cell. The controller may be configured to determine whether the at least one first battery cell is in the thermal runaway state based on the cell temperature information of the at least one first battery cell.

The controller may be configured to determine whether the temperature of the at least one first battery cell is greater than or equal to the suction air temperature based on the cell temperature information of the at least one first battery cell and the suction temperature information, and to determine whether the second battery cell is in the thermal runaway state based on the discharge air temperature and the temperature of the at least one first battery cell in response to determining that the temperature of the at least one first battery cell is greater than or equal to the suction air temperature.

The controller may be configured to determine whether the temperature of the at least one first battery cell is greater than or equal to the suction air temperature based on the cell temperature information of the at least one first battery cell and the suction temperature information, and in response to determining that the temperature of the at least one first battery cell is less than the suction air temperature, to determine whether the second battery cell is in the thermal runaway state based on the discharge air temperature and the suction air temperature.

The controller may be configured to transmit notification information to an outputter so that the notification information about thermal runaway is output in response to determining that the battery is in a thermal runaway state.

In accordance with another aspect of the disclosure, a battery management apparatus may include a motor configured to generate a driving force; a battery composed of a plurality of battery cells, the battery configured to supply power to the motor; a first temperature detector configured to detect a temperature of at least one battery cell of the plurality of battery cells; a second temperature detector configured to detect a temperature of air to be discharged through an air outlet of a case of a battery pack; a third temperature detector configured to detect a temperature of air suctioned through an air inlet of the case of the battery pack; a fan configured to induce a flow of air suctioned through the air inlet to be discharged to the air outlet; and a battery management apparatus configured to determine whether a battery is in a thermal runaway state based on at least one of cell temperature information about the temperature of the at least one battery cell detected by the first temperature detector, discharge temperature information about a discharge air temperature detected by the second temperature detector, or suction temperature information about a suction air temperature detected by the third temperature detector, and to control the fan so that the fan rotates at predetermined revolutions per minute (RPM) in response to determining that the battery is in the thermal runaway state.

The vehicle may further include a switching element configured to supply power to the battery, or to cut off the supply of power to the battery. The battery management apparatus may be configured to control an off operation of the switching element in response to determining that the battery is in the thermal runaway state.

The battery management apparatus may be configured to control the RPM of the fan based on the cell temperature information in response to determining that the battery is in a normal state.

The plurality of battery cells may include at least one first battery cell provided with the first temperature detector, and a second battery cell excluding the first battery cell. The battery management apparatus may be configured to determine whether the temperature of the at least one first battery cell is greater than or equal to a set temperature based on the cell temperature information of the at least one first battery cell, and to determine whether the at least one first battery cell is in the thermal runaway state in response to determining that the temperature of the at least one first battery cell is greater than or equal to the set temperature.

The battery management apparatus may be configured to determine whether the temperature of the at least one first battery cell is greater than or equal to the suction air temperature based on the cell temperature information of the at least one first battery cell and the suction temperature information; in response to determining that the temperature of the at least one first battery cell is greater than or equal to the suction air temperature, to determine whether the discharge air temperature is greater than or equal to the temperature of the at least one first battery cell; and in response to determining that the discharge air temperature is greater than or equal to the temperature of the at least one first battery cell, to determine whether the second battery cell is in the thermal runaway state.

The battery management apparatus may be configured to determine whether the temperature of the at least one first battery cell is greater than or equal to the suction air temperature based on the cell temperature information of the at least one first battery cell and the suction temperature information; in response to determining that the temperature of the at least one first battery cell is less than the suction air temperature, to determine whether the discharge air temperature is greater than or equal to the suction air temperature; and in response to determining that the discharge air temperature is greater than or equal to the suction air temperature, to determine whether the second battery cell is in the thermal runaway state.

The vehicle may further include at least one of a display or a sound outputter. The battery management apparatus may be configured to control the outputter to output notification information about thermal runaway in response to determining that the battery is in the thermal runaway state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It will be further understood that the term "connect" and its derivatives refer both to direct and indirect connection, and the indirect connection includes a connection over a wireless communication network.

It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 1:
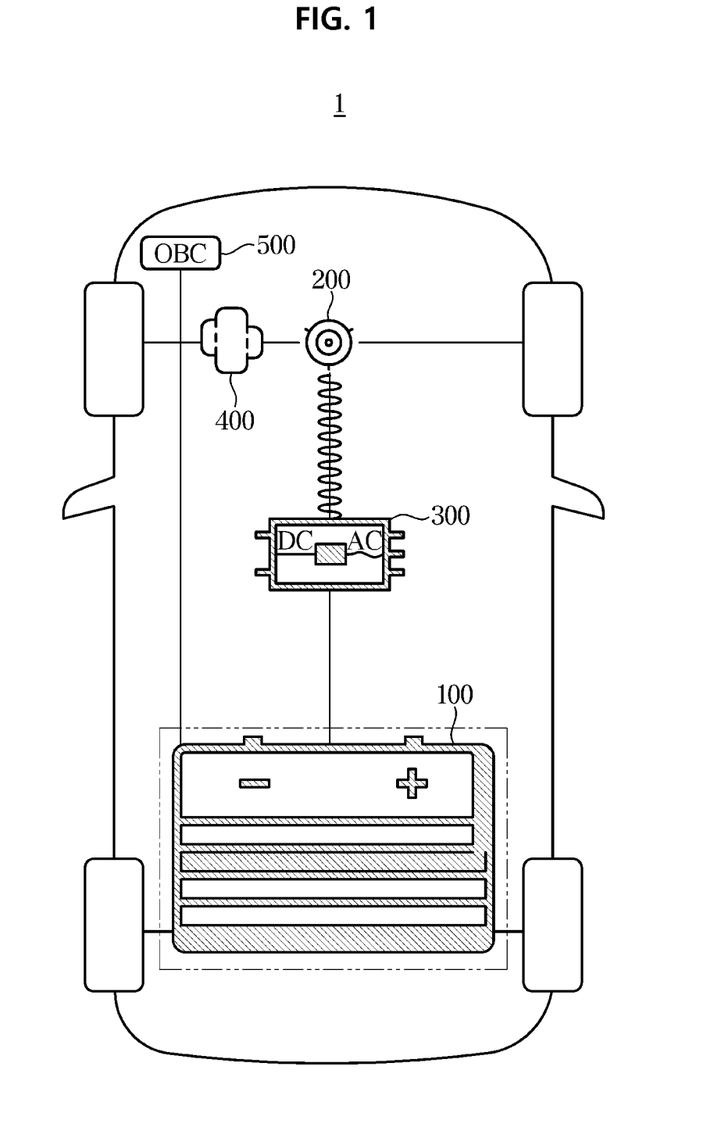
FIG. 1 is a view illustrating a vehicle equipped with a battery pack according to an embodiment of the disclosure.

FIG. 1 is a view illustrating a vehicle equipped with a battery pack according to an embodiment of the disclosure.

A vehicle 1 according to an embodiment is an eco-friendly vehicle, and may be a hybrid vehicle or an electric vehicle. In the embodiment, the electric vehicle will be described as an example.

The vehicle 1 may include a body with exterior and interior parts, and a chassis, on which mechanical devices required for driving are installed.

The chassis is a frame to support the body, having wheels equipped at the front and rear and on the left and right of the vehicle 1, a power system for applying a driving force to the wheels, a steering system, a brake system for applying a braking force to the wheels, and a suspension system arranged thereon.

As illustrated in FIG. 1, the power system of the vehicle 1 may include a battery pack 100, a motor 200, a motor driver 300, a decelerator 400, and a slow-speed charger 500.

The battery pack 100 may include a battery that generates a high-voltage current to supply the driving force to the vehicle 1. The battery may be formed by connecting a plurality of battery modules in series and parallel. Each of the battery modules may be formed of a plurality of battery cells.

That is, the most basic unit of the battery may be the battery cell, and the battery cells may basically have a voltage of 3.6 V to 3.7 V each. The battery cells may be combined to form the battery module, and the battery modules may be combined to form the battery pack.

The battery may be electrically connected to electronic devices such as various convenience devices and additional devices provided in the vehicle 1 to supply driving power to the electronic devices.

The battery may be charged with power supplied from a charger disposed in a parking lot or a charging station. That is, the battery may be the battery capable of charging and discharging.

The battery may be charged using power generated by the motor 200 that performs a power generation function during regenerative braking of the vehicle 1.

The battery pack 100 may be provided under a seat in the vehicle 1. Through this, it is possible to secure an interior space of a trunk inside the vehicle 1, and to secure safety in case of a rear collision.

In addition, the battery pack 100 may be provided in the rear of a rear seat and a tire well.

A detailed configuration of the battery pack will be described herein.

The vehicle 1 may further include a power converter.

The power converter may convert power supplied from the outside into power for charging the battery and supply the converted power to the battery. Here, the power supplied from the outside may be the power of the charging station.

The motor 200 may generate a turning force (also called rotation power) using an electric energy from the battery, and transmit the generated turning force to the wheels to drive the wheels.

The motor 200 may convert the electric energy of the battery 143 into a dynamic energy for operating various electric devices provided in the vehicle 1.

The vehicle 1 may supply a maximum current to the motor 200 so that a maximum torque is generated when a booting button is turned on.

The motor 200 may operate as a generator in an energy regeneration mode due to braking, deceleration, or low-speed driving, enabling the battery of the battery pack 100 to be charged.

The motor driver 300 may drive the motor 200 in response to a control command from a controller. The motor driver 300 may include an inverter that converts the power of the battery into driving power of the motor 200.

When outputting the driving power of the motor 200, the inverter may output the driving power of the motor 200 based on a target speed according to a user command. The driving power of the motor 200 may vary according to a switching signal for outputting a current corresponding to the target speed and the switching signal for outputting a voltage corresponding to the target speed. That is, the inverter may include a plurality of switching elements.

The inverter may also transmit power generated from the motor 200 to the battery during regenerative braking. That is, the inverter may perform a function of changing a direction and output of the current between the motor 200 and the battery.

The decelerator 400 may decrease the speed of the motor 200 and transmit the turning force obtained by increasing the torque of the motor 200 to the wheels.

The vehicle 1 may further include the charger provided at the exterior parts of the body, connected to a charging cable and receiving power for charging the battery.

The charger may include a high-speed charger for quick charging the battery and the slow-speed charger 500 for charging the battery to a slower rate than a rapid charging rate.

A cable for the quick charging may be connected to the high-speed charger, and a cable for slow charging may be connected to the slow-speed charger 500.

It is also possible to have the high-speed charger for quick charging and the slow-speed charger 500 for the slow charging at a slower charging rate than the quick charging at the same location or different locations on the exterior parts of the vehicle 1.

The slow-speed charger 500 may convert external commercial power (AC) into rectified and direct current and transmit it to the battery. For example, the slow-speed charger 500 may include an AC rectifier, a power factor correction (PFC), a converter, and a capacitor.

The high-speed charger may include at least one of a terminal or a cable for directly connecting an external high-speed charger and the battery.

Figure 2:
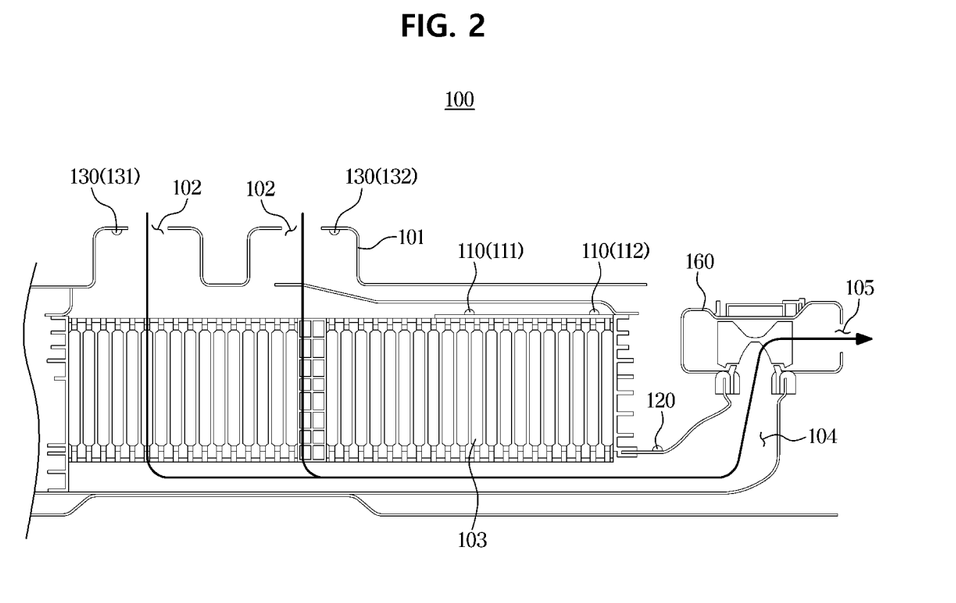
FIG. 2 is a view illustrating a battery pack according to an embodiment of the disclosure.

FIG. 2 is a view illustrating a battery pack according to an embodiment of the disclosure.

The battery pack 100 may include a case 101 and a battery 103 accommodated in the case 101.

The case 101 may be provided with an air inlet 102 through which outdoor air is suctioned into the case 101. Here, the air inlet 102 may be one or more air inlets. The outdoor air suctioned into the case 101 may be air inside the vehicle 1.

The case 101 may be provided with a flow path 104 through which the suctioned air can move.

The case 101 may be provided with an air outlet 105 through which air or gas in the case 101 is discharged.

A fan 160 for generating a suction force for discharging air or gas in the case 101 to the outside may be provided at the air outlet 105 of the case 101.

The battery 103 may include the plurality of battery modules. Each of the battery modules may include the plurality of battery cells.

A flow path gap may be provided between the plurality of battery modules. By dividing the battery 103 into the plurality of battery modules in a module unit, stability may be ensured even in the event of a failure of any one battery cell or any one battery module.

The battery pack 100 may include a plurality of temperature detectors.

The plurality of temperature detectors may include a first temperature detector 110 provided in the battery cell and detecting a temperature of the battery cell and a second temperature detector 120 provided in the flow path 104 in the case 101 and detecting a temperature of air discharged from the case 101 to the outside.

The first temperature detector 110 may be provided in one or more of the plurality of battery cells.

The first temperature detector 110 may be provided in the battery cell disposed adjacent to the air outlet 105 among the plurality of battery cells in the case 101, and provided in the battery cell disposed to be spaced apart from the air inlet 102.

The first temperature detector 110 may be provided in the battery cell in which a maximum temperature is detected, or may be provided in the battery cell in which a minimum temperature is detected among the plurality of battery cells during discharge or charging.

Here, among the plurality of battery cells, the battery cell in which the maximum temperature is detected and the battery cell in which the minimum temperature is detected may be determined from information obtained through an experiment.

The first temperature detector 110 may be disposed on a surface through which suctioned air flows among a plurality of surfaces of the battery cell.

The first temperature detector 110 may include a first temperature sensor 111 and a second temperature sensor 112 disposed in different battery cells and spaced apart from each other.

The second temperature detector 120 may be provided in the flow path 104 in the case 101, but may be provided around at least one of the air outlet 105 or the inlet of the case 101 and may be provided adjacent to the fan 160.

The second temperature detector 120 may be disposed on the surface through which air to be discharged flows among the plurality of surfaces of the battery cell.

The second temperature detector 120 may be provided in a rear direction with the first temperature detector 110 based on the battery 103.

The plurality of temperature detectors may include a third temperature detector 130 for detecting a temperature of air suctioned into the case 101 from the outside of the case 101.

The third temperature detector 130 may be a temperature detector for detecting a temperature inside the vehicle 1.

The third temperature detector 130 may be provided inside the vehicle 1.

For example, the third temperature detector 130 may be provided in the flow path 104 in the case 101, but may be provided around the air inlet 102 of the case 101. The third temperature detector 130 may be provided in the flow path 104 within the case 101. The third temperature detector 130 may be provided outside the case 101 but may be provided around the air inlet 102. The third temperature detector 130 may be provided outside the case 101 but may be provided adjacent to the case 101.

When a plurality of air inlets 102 are provided in the case 101, the third temperature detector 130 may be provided around each of the air inlets 102. For example, the third temperature detector 130 may include a third temperature sensor 131 and a fourth temperature sensor 132 provided around each of the air inlets 102.

When the plurality of air inlets 102 are provided in the case 101, the third temperature detector 130 may be provided only around one air inlet 102.

The fan 160 may allow the air inside the case 101 of the battery pack 100 to be discharged to the outside, thereby reducing the temperature of the battery pack 100.

The fan 160 may allow gas generated when the gas is generated in the case 101 of the battery pack 100 to be discharged to the outside.

The fan 160 may be disposed on the air inlet 102 side of the case 101 to generate a blowing force.

The fan 160 may induce the flow of air inside the case 101.

A battery management apparatus for monitoring a state of the battery 103 may be provided at one side of the battery pack 100.

It is also possible to provide the battery management apparatus in the case 101 of the battery pack 100.

Figure 3:
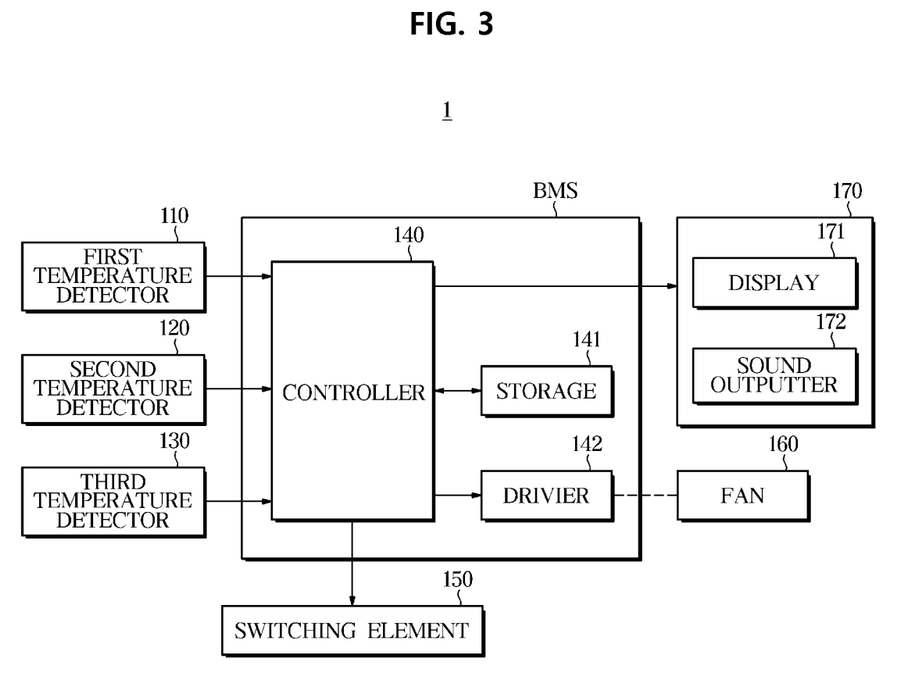
FIG. 3 is a control configuration diagram of a battery management apparatus according to an embodiment of the disclosure.

FIG. 3 is a control configuration diagram of a battery management apparatus according to an embodiment of the disclosure.

The battery management apparatus (BMS) may communicate with a plurality of temperature detectors 110, 120, 130, an outputter 170, and a vehicle controller.

It is also possible to implement the battery management apparatus and the vehicle controller with a single processor.

The battery management apparatus may include one or more communication modules that enable communication with internal components of the vehicle 1 and internal components of the battery pack 100, for example, at least one of a short-range communication module, a wired communication module, or a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module.

In the disclosure, the first, second, and third temperature detectors 110, 120, and 130 are not included as a configuration of the battery management apparatus, but the first, second, and third temperature detectors 110, 120, and 130 may be part of the battery management apparatus.

The battery management apparatus may monitor a state of charge (SOC) of the battery 103 and transmit state information about the SOC of the battery 103 to the vehicle controller provided in the vehicle 1.

The battery management apparatus may include a current detector for detecting a current of the battery 103 and a voltage detector for detecting a voltage at an output terminal of the battery 103.

The battery management apparatus may monitor the SOC of the battery 103 based on the detected current of the battery 103.

The battery management apparatus may also monitor the SOC of the battery 103 based on the detected current and voltage of the battery 103.

The battery management apparatus may monitor the SOC of the battery 103 based on the current, voltage, and temperature of each of the battery cells.

Here, the SOC of the battery 103 may include an amount of charge of the battery 103.

The battery management apparatus may obtain the SOC of the battery 103 corresponding to the current, voltage, and temperature of the battery cells from a table stored in advance. In the table stored in advance, the amount of charge of the battery 103 corresponding to the correlation between the current, voltage, and temperature of the battery cells may be matched.

When a booting on command is received from the vehicle controller, the battery management apparatus may identify the SOC of the battery 103 and output charging state information about the SOC of the identified battery 103 to the vehicle controller.

The battery management apparatus may receive various temperature information from the plurality of temperature detectors 110, 120, 130, monitor the state of the battery 103 based on the received various temperature information, and diagnose a thermal runaway of battery 103.

The battery management apparatus may include a controller 140, a storage 141, and a driver 142.

The controller 140 may determine whether the temperature of the battery cell is greater than or equal to a set temperature based on cell temperature information about the temperature of the battery cell detected by the first temperature detector 110. When it is determined that the temperature of the battery cell is greater than or equal to the set temperature, the controller 140 may control the outputter 170 to output guide information about the thermal runaway.

When it is determined that the temperature of the battery cell is greater than or equal to the set temperature, the controller 140 may control a driving of the fan 160 so that the fan 160 rotates at a maximum revolutions per minute (RPM).

When it is determined that the temperature of the battery cell is greater than or equal to the set temperature, the controller 140 may control a driving of the fan 160 so that the fan 160 rotates at a predetermined revolutions per minute (RPM). The predetermined revolutions per minute (RPM) is an optimum revolutions per minute corresponding to the amount of gas generated.

When it is determined that the temperature of the battery cell is greater than or equal to the set temperature, the controller 140 may control an operation of a switching element 150 to cut off the supply of power.

That is, the controller 140 may control the switching element 150 to be turned off. Here, the set temperature is a preset and stored temperature, and may be any one temperature between 60° C. and 65° C.

The controller 140 may turn on and control the switching element 150 when the battery 103 is in a normal state.

When a plurality of temperature sensors are included in the first temperature detector 110, the controller 140 may determine whether the state of each of the battery cells is a thermal runaway state based on the cell temperature information of each of the battery cells respectively detected by the plurality of temperature sensors.

When the plurality of temperature sensors are included in the first temperature detector 110, the controller 140 may determine whether the state of the battery 103 is the thermal runaway state based on the cell temperature information of the battery cell detected by any one temperature sensor. Here, the state of the battery 103 may include the state of the entire battery cell.

When the plurality of temperature sensors are included in the first temperature detector 110, the controller 140 may identify the temperature of the highest battery cell based on the cell temperature information of the battery cells detected by the plurality of temperature sensors, and determine whether the state of the battery 103 is the thermal runaway state based on maximum temperature information.

When the plurality of temperature sensors are included in the first temperature detector 110, the controller 140 may identify the temperature of the lowest battery cell based on the cell temperature information of the battery cells detected by the plurality of temperature sensors, and determine whether the state of the battery 103 is the thermal runaway state based on minimum temperature information.

When the plurality of temperature sensors are included in the first temperature detector 110, the controller 140 may identify an average temperature of the battery cells based on the cell temperature information of the battery cells detected by the plurality of temperature sensors, and determine whether the state of the battery 103 is the thermal runaway state based on average temperature information about the obtained average temperature of the battery cells.

The controller 140 may determine whether the battery 103 is in thermal runaway based on discharge temperature information about a discharge air temperature detected by the second temperature detector 120.

The controller 140 may determine whether the discharge air temperature is greater than or equal to a reference temperature based on the discharge temperature information about the discharge air temperature detected by the second temperature detector 120. When it is determined that the discharge air temperature is greater than or equal to the reference temperature, the controller 140 may determine that the battery 103 is in the thermal runaway state. When it is determined that the discharge air temperature is less than the reference temperature, the controller 140 may determine that the battery 103 is in a normal state.

The controller 140 may determine the thermal runaway of the battery cell in which the first temperature detector 110 is not installed based on the temperature information detected by the first and second temperature detectors 110 and 120.

More particularly, the controller 140 may determine whether the battery 103 is thermal runaway based on the cell temperature information about the temperature of the battery cell detected by the first temperature detector 110 and the discharge temperature information about the discharge air temperature detected by the second temperature detector 120.

The controller 140 may determine whether the discharge air temperature is greater than or equal to the temperature of the battery cell based on the cell temperature information and the discharge temperature information. When it is determined that the discharge air temperature is greater than or equal to the temperature of the battery cell, the controller 140 may determine that the state of the battery 103 is in the normal state. When it is determined that the discharge air temperature is less than the temperature of the battery cell, the controller 140 may determine that the state of the battery 103 is in the thermal runaway state.

The controller 140 may determine whether the battery 103 is in thermal runaway based on suction temperature information about a suction air temperature detected by the third temperature detector 130 and the discharge temperature information about the discharge air temperature detected by the second temperature detector 120.

The suction air temperature detected by the third temperature detector 130 may be a temperature of air suctioned from the outside of the battery pack 100 to the inside, and may be a temperature inside the vehicle 1.

The controller 140 may determine whether the discharge air temperature is greater than or equal to the suction air temperature based on the suction temperature information and the discharge temperature information. When it is determined that the discharge air temperature is greater than or equal to the suction air temperature, the controller 140 may determine that the state of the battery 103 is in the normal state. When it is determined that the discharge air temperature is less than the suction air temperature, the controller 140 may determine that the state of the battery 103 is in the thermal runaway state.

The controller 140 may determine whether the battery 103 is in thermal runaway based on the cell temperature information about the temperature of the battery cell detected by the first temperature detector 110, the suction temperature information about the suction air temperature detected by the third temperature detector 130, and the second temperature detector 120, or the discharge temperature information about the discharge air temperature detected by the second temperature detector 120.

The controller 140 may determine whether the temperature of the battery cell is greater than or equal to the suction air temperature based on the cell temperature information and the suction temperature information. When it is determined that the temperature of the battery cell is greater than or equal to the suction air temperature, the controller 140 may determine whether the discharge air temperature is greater than or equal to the temperature of the battery cell based on the discharge temperature information and the cell temperature information. When it is determined that the discharge air temperature is greater than or equal to the temperature of the battery cell, the controller 140 may determine that the battery 103 is in the thermal runaway state. When it is determined that the discharge air temperature is less than the temperature of the battery cell, the controller 140 may determine that the battery 103 is in the normal state.

The controller 140 may determine whether the temperature of the battery cell is greater than or equal to the suction air temperature based on the cell temperature information and the suction temperature information. When it is determined that the temperature of the battery cell is less than the suction air temperature, the controller 140 may determine whether the discharge air temperature is greater than or equal to the suction air temperature based on the discharge temperature information and the suction temperature information. When it is determined that the discharge air temperature is greater than or equal to the suction air temperature, the controller 140 may determine that the battery 103 is in the thermal runaway state. When it is determined that the discharge air temperature is less than the suction air temperature, the controller 140 may determine that the battery 103 is in the normal state.

In order to determine whether or not the thermal runaway of the battery cell (i.e., a first battery cell) in which the first temperature detector 110 is installed occurs, the controller 140 may determine that the state of the first battery cell is in the thermal runaway state when the temperature of the first battery cell detected by the first temperature detector 110 is greater than or equal to the set temperature.

In order to determine whether or not the thermal runaway of the battery cell (i.e., a second battery cell) in which the first temperature detector 110 is not installed occurs, the controller 140 may compare the temperature of the first battery cell and the suction air temperature detected by the first temperature detector 110, and may determine that the state of the second battery cell is in the thermal runaway state by comparing the discharge air temperature and the temperature of the first battery cell or comparing the discharge air temperature and the suction air temperature based on the comparison result of the temperature of the first battery cell and the suction air temperature.

The controller 140 may control the RPM of the fan 160 based on the cell temperature information of the battery cell to cool the battery 103.

The controller 140 may control the RPM of the fan 160 based on at least one of the suction temperature information or the discharge temperature information.

When it is determined that the state of the battery 103 is in the thermal runaway state, the controller 140 may control the operation of the switching element 150 to stop charging and discharging of the battery 103. At this time, the controller 140 may control the switching element 150 to be turned off.

When it is determined that the state of the battery 103 is in the thermal runaway state, the controller 140 may control the driving of the fan 160 so that the fan 160 rotates at the maximum RPM. Through this, gas generated from the battery 103 may be discharged to the outside.

Figure 4:
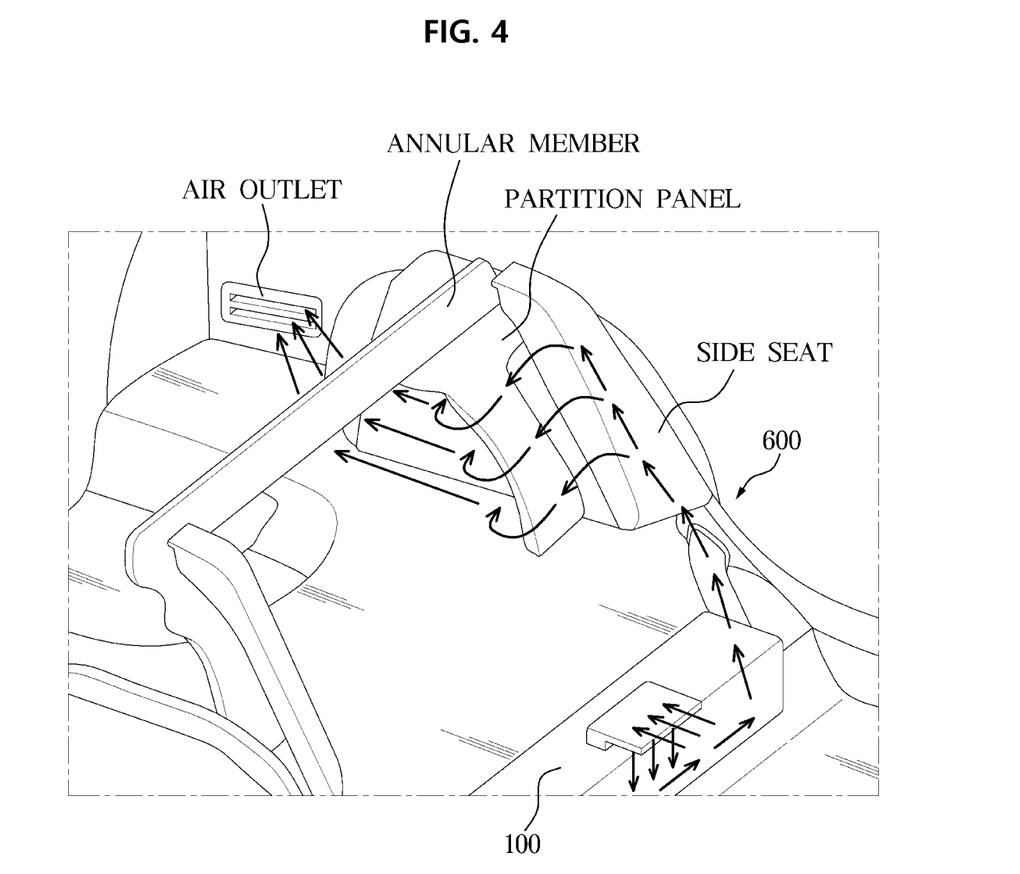
FIG. 4 is a view illustrating a battery management apparatus according to an embodiment of the disclosure.

When it is determined that the state of the battery 103 is in the thermal runaway state, the controller 140 may control the driving of the fan 160 so that the fan 160 rotates at the predetermined RPM As illustrated in FIG. 4, the battery pack 100 may be disposed under the seat 600 in the vehicle 1, and the gas generated from the battery 103 in the battery pack 100 may be discharged to the outside through the air outlet 105 along a side seat and a partition panel under the seat 600 by rotation of the fan 160.

When it is determined that the state of the battery 103 is the thermal runaway state, the controller 140 may control the output of the guide information about the thermal runaway. The controller 140 may transmit the guide information about the thermal runaway to the outputter 170.

The controller 140 may directly transmit the guide information about the thermal runaway to the outputter 170 and transmits the guide information about the thermal runaway to the vehicle controller.

The controller 140 according to an embodiment may be implemented with a memory storing an algorithm to control operation of the components in the battery pack 100 or data about a program that implements the algorithm, and a processor carrying out the aforementioned operation using the data stored in the memory. The memory and the processor may be implemented in separate chips. Alternatively, the memory and the processor may be implemented in a single chip.

The storage 141 may store information about the reference temperature, the set temperature, and the maximum RPM of the fan 160.

The storage 141 may store information about the predetermined RPM of the fan 160.

The storage 141 may store information about the RPM of the fan 160 corresponding to the cell temperature information of the battery cell.

The storage 141 may be a memory implemented with a chip separate from the aforementioned processor in relation to the controller 140, or may be implemented integrally with the processor in a single chip.

The storage 141 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The driver 142 may rotate the fan 160 in response to a control command from the controller 140.

The driver 142 may adjust the current or voltage applied to the fan motor provided in the fan 160. The driver 142 may perform pulse width modulation (PWM) of the current or voltage applied to the fan motor in response to the control command of the controller 140.

The driver 142 may include an inverter for controlling the current or voltage applied to the fan motor.

The switching element 150 may perform an on or off operation in response to the control command of the controller 140. The switching element 150 may perform the on operation when the battery 103 is in the normal state, and may perform the off operation when the battery 103 is in the thermal runaway state.

The switching element 150 may include a relay that supplies and cuts off the power charged in the battery 103 to the motor 200. The switching element 150 may protect the battery cell and secure electrical safety.

The switching element 150 may further include a switch for disconnecting the connection with the battery 103 to prevent an electric shock accident during maintenance and repair of parts.

The fan 160 may rotate in response to the current and voltage applied from the driver 142.

The fan 160 may perform a cooling function to discharge heat generated when the battery 103 is charged or discharged.

The fan 160 may rotate when the temperature of the battery cell reaches a certain temperature or higher. The fan 160 allow cooling to be performed using the airflow inside the case 101 of the battery pack 100.

The fan 160 may rotate at the maximum RPM when the battery 103 is in the thermal runaway state so that the gas in the battery pack 100 is discharged to the outside.

The fan 160 may rotate at the predetermined RPM when the battery 103 is in the thermal runaway state so that the gas in the battery pack 100 is discharged to the outside.

The outputter 170 may output the state information of the battery 103 in response to the control command of the controller 140.

The outputter 170 may output the guide information about the thermal runaway of the battery 103 in response to the control command of the controller 140.

The outputter 170 may include at least one of a display 171 that displays various information as an image or a sound outputter 172 that outputs various information as a sound.

The display 171 may display the guide information about the thermal runaway of the battery 103.

The display 171 may output information about various functions performed in the vehicle 1 and information about various functions for user convenience.

The display 171 may display battery management information, and may display current charging state information of the battery 103.

The display 171 may also display the temperature and gas amount of the battery 103.

The display 171 may be provided in a head unit or a center fascia, or may be provided in a cluster.

The sound outputter 172 may output the information about the thermal runaway of the battery 103 as the sound such as a warning sound.

The sound outputter 172 may output the output information of at least one of an audio device or a radio device as the sound.

In addition, a plurality of sound outputters 171 may be provided, and the plurality of sound outputters 172 may be provided at different locations inside the vehicle 1. Here, the sound outputter 172 may include a speaker.

Figure 5:
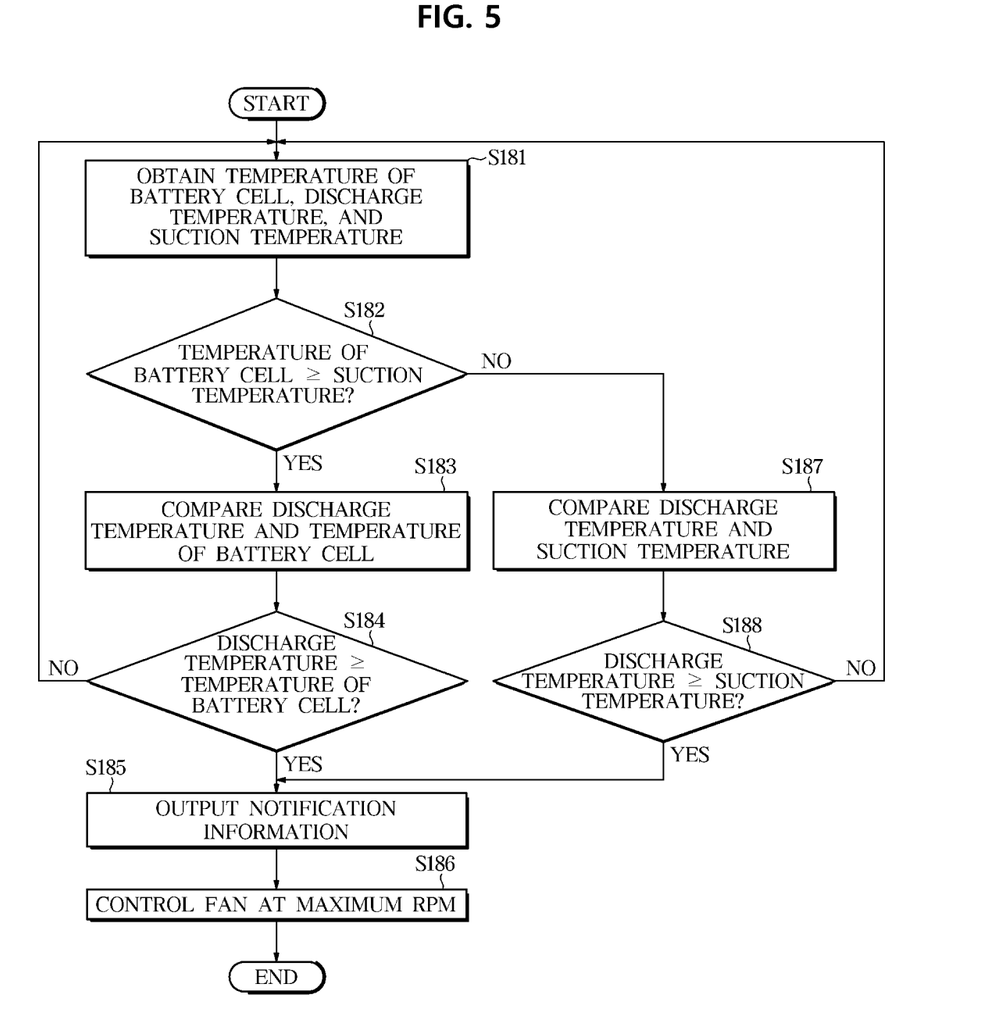
FIG. 5 is a control flowchart of a battery management apparatus according to an embodiment of the disclosure.

FIG. 5 is a control flowchart of a battery management apparatus according to an embodiment of the disclosure.

The battery management apparatus may also determine whether the battery cell (i.e., the first battery cell) with the first temperature detector 110 is in thermal runaway, determine the battery cell (i.e., the second battery cell) without the first temperature detector 110 is in thermal runaway, and determine whether the entire battery cells (i.e., battery) is thermal runaway.

Determining whether the first battery cell is in thermal runaway is described as an example. The battery management apparatus may determine whether the temperature of the first battery cell is greater than or equal to the set temperature based on the cell temperature information about the temperature of the first battery cell detected by the first temperature detector 110. When it is determined whether the temperature of the first battery cell is greater than or equal to the set temperature, the battery management apparatus may determine that the state of the first battery cell is the thermal runaway state.

Determination of thermal runaway for the second battery cell will be described as an example.

First, when the battery management apparatus determines that the battery 103 is in a charging/discharging state, the battery management apparatus may identify the cell temperature information about the temperature of the battery cell detected by the first temperature detector 110, the discharge temperature information about the discharge air temperature detected by the second temperature detector 120, and the suction temperature information about the suction air temperature detected by the third temperature detector 130, and obtain the temperature of battery cell, the discharge air temperature, and the suction air temperature based on the identified cell temperature information, discharge temperature information, and suction temperature information (S181).

The battery management apparatus may determine whether the temperature of the battery cell is greater than or equal to the suction air temperature based on the cell temperature information and the suction temperature information (S182). When it is determined that the temperature of the battery cell is greater than or equal to the suction air temperature, the battery management apparatus may compare the discharge temperature information and the cell temperature information (S183). At this time, the battery management apparatus may determine whether the discharge air temperature is greater than or equal to the temperature of the battery cell based on the discharge temperature information and the cell temperature information (S184). When it is determined that the discharge air temperature is greater than or equal to the temperature of the battery cell, the battery management apparatus may determine that the state of the battery 103 is the thermal runaway state and output the notification information (S185).

Here, outputting the notification information may include displaying the image guiding the occupant's escape through the display 171.

Outputting the notification information may include outputting the sound or voice guiding the occupant's escape through the sound outputter 172.

The battery management apparatus may control the operation of the fan 160 so that the fan 160 rotates at the maximum RPM in preparation for gas generation in the battery cell (S186).

The battery management apparatus may control the operation of the fan 160 so that the fan 160 rotates at the predetermined RPM in preparation for gas generation in the battery cell.

On the other hand, when the battery management apparatus determines that the discharge air temperature is less than the temperature of the battery cell, the battery management apparatus may determine that the battery 103 is in the normal state.

When determining whether the temperature of the battery cell is greater than or equal to the suction air temperature based on the cell temperature information and the suction temperature information, the battery management apparatus may compare the discharge temperature information with the suction temperature information when it is determined that the temperature of the battery cell is less than the suction air temperature (S187). At this time, the battery management apparatus may determine whether the discharge air temperature is greater than or equal to the suction air temperature based on the discharge temperature information and the suction temperature information (S187). When it is determined that the discharge air temperature is greater than or equal to the suction air temperature, the battery management apparatus may determine that the state of the battery is the thermal runaway state and output the notification information (S185).

In addition, the battery management apparatus may control the operation of the fan 160 so that the fan 160 rotates at the maximum RPM in preparation for gas generation in the battery cell (S186).

In addition, the battery management apparatus may control the operation of the fan 160 so that the fan 160 rotates at the predetermined RPM in preparation for gas generation in the battery cell.

On the other hand, when the battery management apparatus determines that the discharge air temperature is less than the suction air temperature, the battery management apparatus may determine that the battery 103 is in the normal state.

Determining whether the entire battery cell (i.e., the battery) has the thermal runaway may include determining the thermal runaway of the second battery cell.

According to the disclosure, it is possible to diagnose an initial thermal runaway to inform the occupants of the danger before a fire or explosion, and to ensure the stability of the vehicle.

The disclosure may diagnose the thermal runaway in not only the battery cell in which the temperature detector is installed, but also the battery cell in which the temperature detector is not installed. That is, the disclosure may diagnose the occurrence of thermal runaway of the battery by using the minimum number of temperature detectors.

The disclosure may reduce the number and cost of the temperature detectors installed in the battery pack because it is not necessary to install the temperature detectors on all of the battery cells.

According to the disclosure, the venting gas generated from the battery cell may be discharged to the outside by controlling the rotation of the fan during the thermal runaway in the battery pack.

As described above, the disclosure may improve the quality and marketability of the battery pack, the battery management apparatus, and vehicle, and may further increase user satisfaction, improve user convenience, reliability, and vehicle safety, and secure product competitiveness.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A battery pack for a vehicle, the battery pack comprising:
   a case having an air outlet and an air inlet;
   a battery composed of a plurality of battery cells, the battery configured to be accommodated in the case;
   a first temperature detector provided in at least one battery cell of the plurality of battery cells, the first temperature detector configured to detect a temperature of the at least one battery cell, wherein the first temperature detector is disposed on a surface through which suctioned air flows among a plurality of surfaces of the at least one battery cell;
   a second temperature detector provided on the case, the second temperature detector configured to detect a temperature of air to be discharged through the air outlet, wherein the second temperature detector is disposed on a surface through which the air to be discharged flows among the plurality of surfaces of the at least one battery cell, and the second temperature detector is provided in a rear direction of the first temperature detector based on the battery;
   a fan provided around at least one of the air outlet or the air inlet of the case, the fan configured to induce a flow of air suctioned through the air inlet to be discharged to the air outlet, and to rotate based on at least one of cell temperature information about the temperature of the at least one battery cell detected by the first temperature detector or discharge temperature information about a discharge air temperature detected by the second temperature detector;
   a controller for controlling the fan; and
   a third temperature detector positioned around the air inlet and configured to detect a suction air temperature through the air inlet,
   wherein the controller determines a thermal runaway state of the battery based on at least one of: the temperature of a highest-temperature battery cell among the cell temperature information of the at least one battery cell detected by the first temperature detector, the temperature of a lowest-temperature battery cell among the cell temperature information of the at least one battery cell detected by the first temperature detector, or an average temperature of the cell temperature information of the at least one battery cell detected by the first temperature detector, and
   wherein the controller is configured to determine that the battery is in the thermal runaway state when, after determining that the temperature of the battery cell is greater than or equal to the suction air temperature, the discharge air temperature is determined to be greater than or equal to the temperature of the battery cell, and the controller is configured to determine that the battery is in a normal state when, after determining that the temperature of the battery cell is greater than or equal to the suction air temperature, the discharge air temperature is determined to be less than the temperature of the battery cell.

2. The battery pack according to claim 1, wherein the controller is configured to control the fan so that the fan rotates at predetermined revolutions per minute (RPM) in response to the at least one battery cell being in the thermal runaway state.

3. The battery pack according to claim 1,
wherein the controller is configured to control the fan so that the fan rotates at predetermined revolutions per minute (RPM) in response to determining that the battery is in the thermal runaway state.

4. The battery pack according to claim 3, further comprising:
a switching element configured to supply power to the battery, or to cut off the supply of power to the battery,
wherein the controller is configured to control an off operation of the switching element in response to determining that the battery is in the thermal runaway state.

5. The battery pack according to claim 3, wherein the controller is configured to control the RPM of the fan based on the cell temperature information in response to determining that the battery is in the normal state.

6. The battery pack according to claim 3, wherein:
the plurality of battery cells comprise at least one first battery cell provided with the first temperature detector, and a second battery cell excluding the first battery cell; and
the controller is configured to determine whether the at least one first battery cell is in the thermal runaway state based on the cell temperature information of the at least one first battery cell.

7. The battery pack according to claim 1, wherein the controller is configured to determine that the battery is in the thermal runaway state when, after determining that the temperature of the battery cell is less than the suction air temperature, the discharge air temperature is determined to be greater than or equal to the suction air temperature, and to determine that the battery is in the normal state when, after determining that the temperature of the battery cell is less than the suction air temperature, the discharge air temperature is determined to be less than the suction air temperature.

8. The battery pack according to claim 1, wherein the controller is configured to transmit notification information to an outputter so that the notification information about thermal runaway is output in response to determining that the battery is in the thermal runaway state.

9. A vehicle, comprising:
a motor configured to generate a driving force;
a battery composed of a plurality of battery cells, the battery configured to supply power to the motor;
a first temperature detector configured to detect a temperature of at least one battery cell of the plurality of battery cells, wherein the first temperature detector is disposed on a surface through which suctioned air flows among a plurality of surfaces of the at least one battery cell;
a second temperature detector configured to detect a temperature of air to be discharged through an air outlet of a case of a battery pack, wherein the second temperature detector is disposed on a surface through which the air to be discharged flows among the plurality of surfaces of the at least one battery cell, and the second temperature detector is provided in a rear direction of the first temperature detector based on the battery;
a third temperature detector configured to detect a suction air temperature through an air inlet of the case of the battery pack;
a fan configured to induce a flow of air suctioned through the air inlet to be discharged to the air outlet; and
a controller configured to:
determine whether a battery is in a thermal runaway state based on at least one of cell temperature information about the temperature of the at least one battery cell detected by the first temperature detector, discharge temperature information about a discharge air temperature detected by the second temperature detector, or suction temperature information about a suction air temperature detected by the third temperature detector, and
control the fan so that the fan rotates at predetermined revolutions per minute (RPM) in response to determining that the battery is in the thermal runaway state,
wherein the controller determines the thermal runaway state of the battery based on at least one of: the temperature of a highest-temperature battery cell among the cell temperature information of the at least one battery cell detected by the first temperature detector, the temperature of a lowest-temperature battery cell among the cell temperature information of the at least one battery cell detected by the first temperature detector, or an average temperature of the cell temperature information of the at least one battery cell detected by the first temperature detector, and
wherein the controller is configured to determine that the battery is in the thermal runaway state when, after determining that the temperature of the battery cell is greater than or equal to the suction air temperature, the discharge air temperature is determined to be greater than or equal to the temperature of the battery cell, and the controller is configured to determine that the battery is in a normal state when, after determining that the temperature of the battery cell is greater than or equal to the suction air temperature, the discharge air temperature is determined to be less than the temperature of the battery cell.

10. The vehicle according to claim 9, further comprising:
a switching element configured to supply power to the battery, or to cut off the supply of power to the battery,
wherein the controller is configured to control an off operation of the switching element in response to determining that the battery is in the thermal runaway state.

11. The vehicle according to claim 9, wherein the controller is configured to control the RPM of the fan based on the cell temperature information in response to determining that the battery is in a normal state.

12. The vehicle according to claim 9, further comprising:
at least one of a display or a sound outputter,
wherein the controller is configured to control the outputter to output notification information about thermal runaway in response to determining that the battery is in the thermal runaway state.

13. The vehicle according to claim 9, wherein the controller is configured to determine that the battery is in the thermal runaway state when, after determining that the temperature of the battery cell is less than the suction air temperature, the discharge air temperature is determined to be greater than or equal to the suction air temperature, and to determine that the battery is in the normal state when, after determining that the temperature of the battery cell is less than the suction air temperature, the discharge air temperature is determined to be less than the suction air temperature.

* * * * *